US006810262B2

(12) United States Patent
Kim

(10) Patent No.: US 6,810,262 B2
(45) Date of Patent: Oct. 26, 2004

(54) METHOD OF TRANSMITTING AND RECEIVING GRAPHIC SHORT MESSAGE SERVICE MESSAGES IN A PORTABLE RADIO TERMINAL

(75) Inventor: Hoe-Won Kim, Namweon-shi (KR)

(73) Assignee: Samsung Electronics Co., Ltd. (KR)

( * ) Notice: Subject to any disclaimer, the term of this patent is extended or adjusted under 35 U.S.C. 154(b) by 538 days.

(21) Appl. No.: 09/854,616

(22) Filed: May 14, 2001

(65) Prior Publication Data

US 2001/0049289 A1 Dec. 6, 2001

(30) Foreign Application Priority Data

May 31, 2000 (KR) ........................................ 2000-29543

(51) Int. Cl.[7] ................................................ H04Q 7/20
(52) U.S. Cl. ...................................... 455/466; 455/566
(58) Field of Search ................................ 455/466, 566, 455/550.1, 422.1, 517

(56) References Cited

U.S. PATENT DOCUMENTS 6,243,596 B1 * 6/2001 Kikinis ....................... 455/572
6,549,236 B2 * 4/2003 Oeda et al. ............. 348/333.05

FOREIGN PATENT DOCUMENTS

| GB | 2 308 523 A | 6/1997 | |
| WO | WO 97/32439 | 9/1997 | |
| WO | WO 99/37105 | * 7/1999 | ............ H04Q/7/22 |

OTHER PUBLICATIONS

European Search Report dated Oct. 15, 2003 issued in a counterpart application, namely, Appln. No. 01113318.8.
Universal Mobile Telecommunications Systems (UMTS) Technical Realization of the Short Message Service (SMS), Apr. 2000, pp. 1–127.

* cited by examiner

Primary Examiner—Nguyen T. Vo
Assistant Examiner—Bryan Fox
(74) Attorney, Agent, or Firm—Dilworth & Barrese, LLP

(57) ABSTRACT

A method of transmitting and receiving graphic data by an SMS message is disclosed. To transmit a graphic SMS message, graphic SMS messages are registered, a portable radio terminal is changed over to a graphic SMS message selection mode upon receipt of an SMS message editing key signal, a graphic SMS message is selected among the registered graphic SMS messages, and the graphic data of the selected graphic SMS message is edited and transmitted.

15 Claims, 10 Drawing Sheets

METHOD OF TRANSMITTING AND RECEIVING GRAPHIC SHORT MESSAGE SERVICE MESSAGES IN A PORTABLE RADIO TERMINAL

This application claims priority to an application entitled "Method of Transmitting and Receiving Graphic Short Message Service Message in Portable Radio Terminal" filed in the Korean Industrial Property Office on May 31, 2000 and assigned Ser. No. 2000-29543, the contents of which are hereby incorporated by reference.

BACKGROUND OF THE INVENTION

1. Field of the Invention

The present invention relates generally to a portable radio terminal system, and in particular, to a method of transmitting and receiving graphic data by a short message service (SMS) message.

2. Description of the Related Art

In general, an SMS as well as a call service are provided to a portable radio terminal. The SMS allows a caller to leave a message in a text message regardless of the state of a called portable radio terminal, even when the called terminal is busy, thereby increasing user convenience.

Since the SMS is limited to text messages, however, a user may feel inconvenienced when he would rather transmit graphic data, such as a map, than transmit it in a text message to indicate a geographical location.

SUMMARY OF THE INVENTION

It is, therefore, an object of the present invention to provide a method of transmitting and receiving graphic data by an SMS message in a portable radio terminal.

To achieve the above object, a method of transmitting and receiving graphic data by an SMS message is provided. In the graphic SMS message transmitting method of the present invention, graphic SMS messages are registered, a portable radio terminal is switched over to a graphic SMS message selection mode upon receipt of an SMS message editing key signal, a graphic SMS message is selected among the registered graphic SMS messages, and the graphic data of the selected graphic SMS message is edited and transmitted.

In the present graphic SMS message receiving method, the header of an SMS message is checked upon receipt of the SMS message, it is determined whether the SMS message is a single graphic SMS message, the sequence number of the graphic SMS message is detected if the SMS message is not a single graphic SMS message, the data of the graphic SMS message is decoded according to the sequence number, and upon receipt of another graphic SMS message successively, the above steps are repeated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
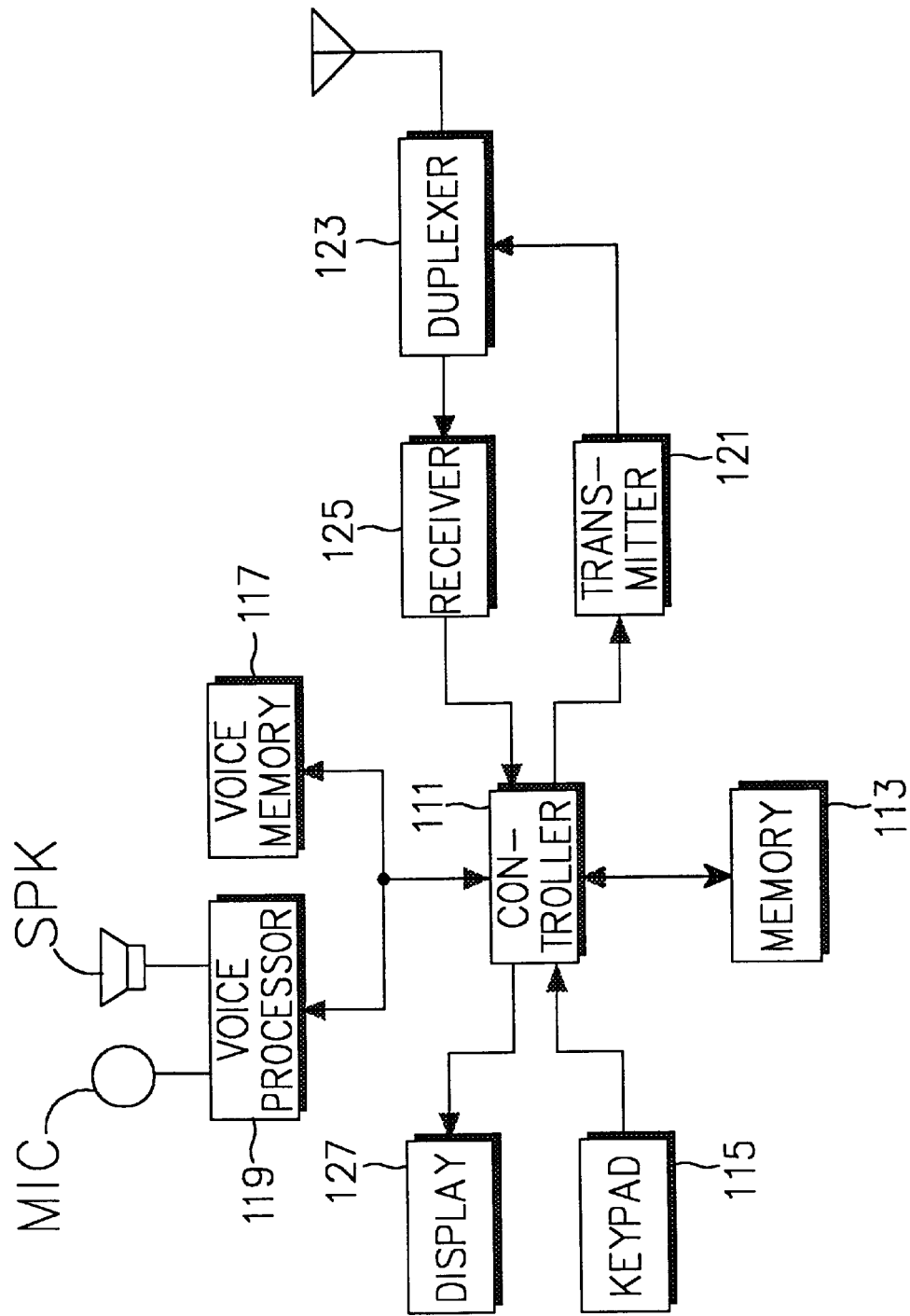
FIG. 1 is a block diagram of a portable radio terminal to which the present invention is applied.

FIG. 1 is a block diagram of a portable radio terminal to which the present invention is applied. Referring to FIG. 1, a controller 111 provides overall control to the portable radio terminal. A memory 113 stores a control program and control data generated during the control operation of the controller 111.

A keypad 115 has a plurality of dialing digit keys and function keys such as MENU, SEND, and END, for generating a key signal corresponding to a key selected by a user and feeding the key signal to the controller 111.

A voice memory 117 stores a plurality of voice messages. A voice processor 119 processes a voice message read from the voice memory 117 to an analog voice signal and outputs the analog voice signal via a speaker. The voice processor 119 also processes an analog voice signal received from the user via a microphone to a digital signal.

A transmitter 121 modulates a signal received from the controller 111 to a digital radio signal and transmits the modulated signal to a duplexer 123. The duplexer 123 transmits the radio signal received from the transmitter 121 via an antenna and a signal received from the antenna to a receiver 125. The receiver 125 demodulates the radio signal received from the duplexer 123 and the controller 111 controls the call according to the demodulated signal received from the receiver 125.

A display 127 includes an LCD (Liquid Crystal Display) and an LED (Light Emitting Diode) and displays control data and input data under the control of the controller 111.

Figure 2:
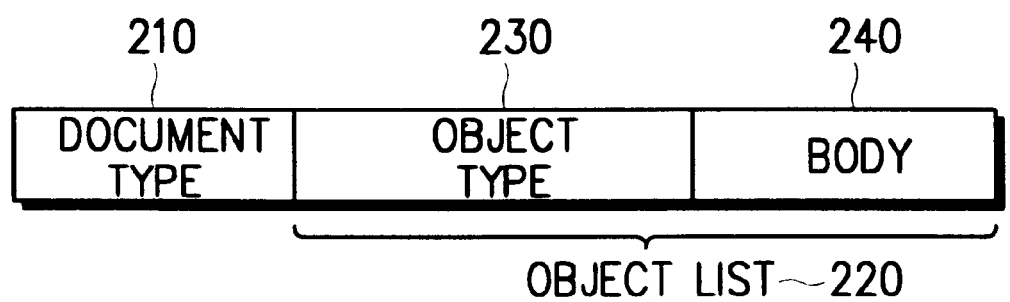
FIG. 2 illustrates an embodiment of an SMS message format according to the present invention.

FIG. 2 illustrates an embodiment of an SMS message format according to the present invention. An SMS supports a fixed amount of text data in a typical portable radio terminal. For example, the European GSM (Global System for Mobile Communications) supports only 160 text characters. According to the present invention, due to the fixed SMS standard, an SMS message is identified as text data or graphic data according to DOCUMENT TYPE 210 in its header. DOCUMENT TYPE 210 is a one-byte flag that discriminates between text data and graphic data according to its pattern.

OBJECT LIST 220 following DOCUMENT TYPE 210 is divided into OBJECT TYPE 230 and BODY 240, and includes real SMS data. OBJECT TYPE 230 indicates what the SMS data represents among a line, a curved line, a polygon, and text. BODY 240 provides the coordinates list of graphic data if OBJECT TYPE 230 indicates graphic data and provides text data if OBJECT TYPE 230 indicates text data.

Figure 3:
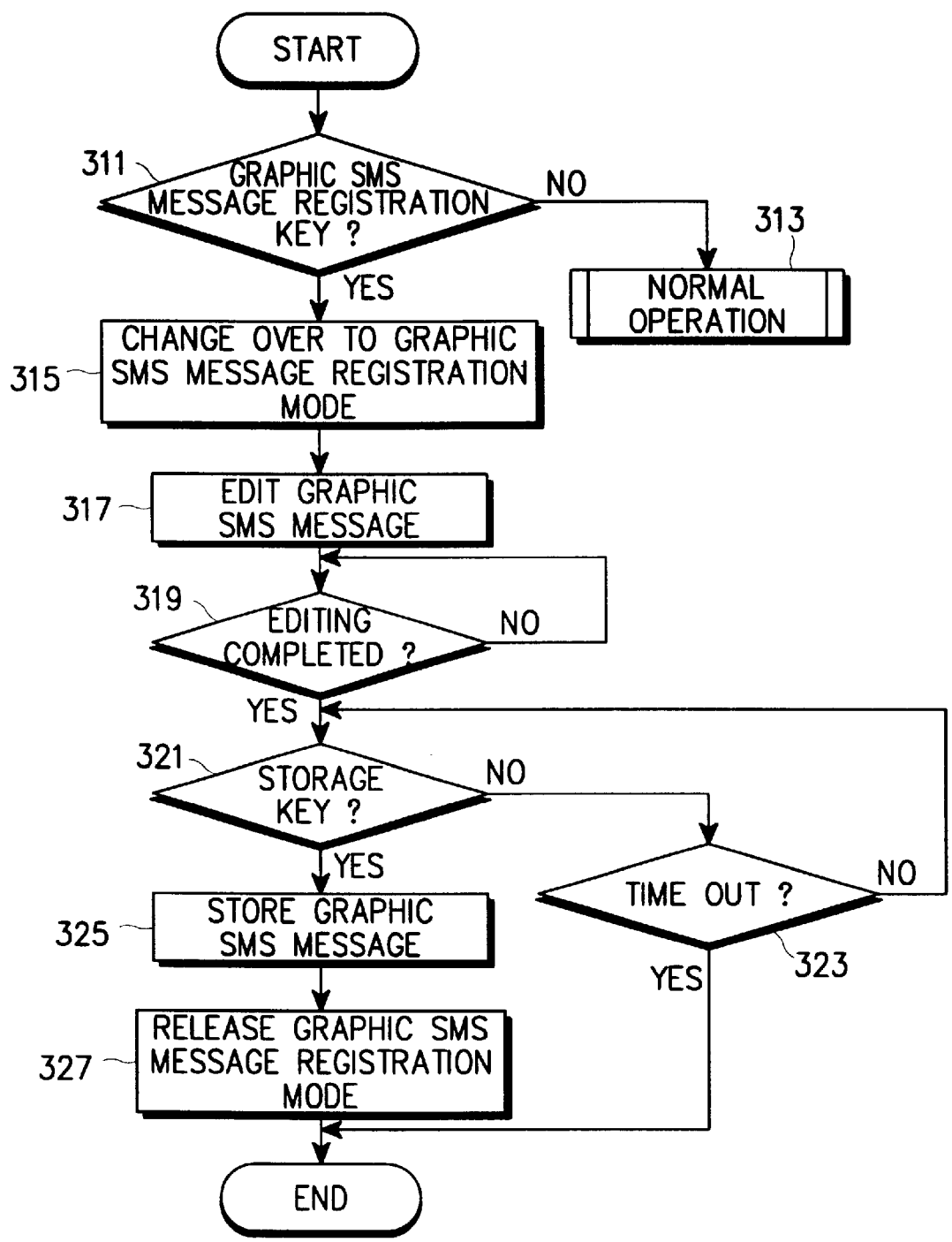
FIG. 3 is a flowchart illustrating an embodiment of a graphic SMS message registering procedure according to the present invention.
Figure 4:
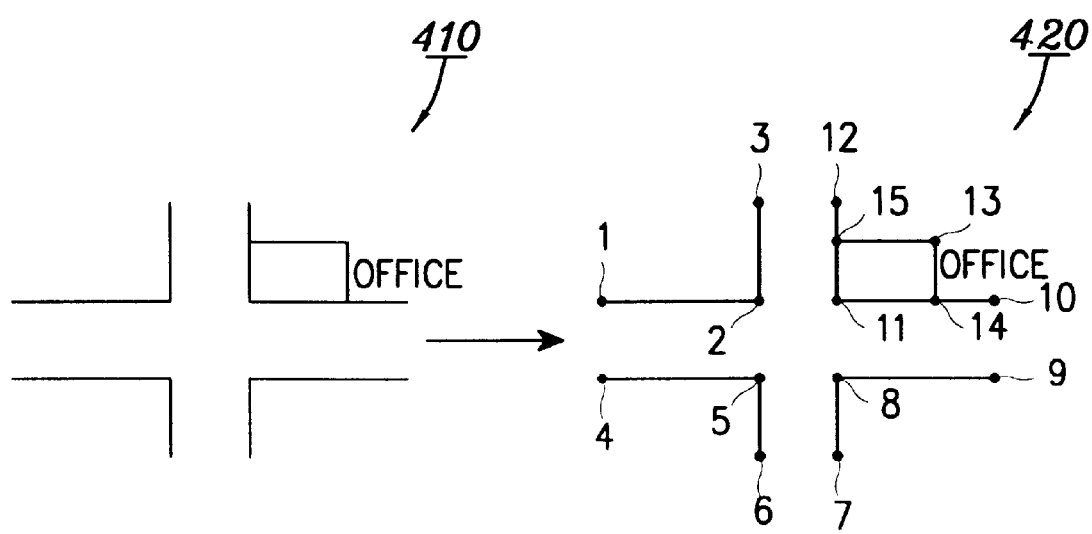
FIG. 4 illustrates an example of an image edited according to an embodiment of the present invention.

FIG. 3 is a flowchart illustrating an embodiment of a graphic SMS message registering procedure according to the present invention and FIG. 4 illustrates an example of an image edited according to an embodiment of the present invention.

Referring to FIG. 3, upon receipt of a key signal from the keypad 115, the controller 111 determines whether the key signal was generated from a graphic SMS message registration key in step 311. If the key signal was generated from any other key, the controller 111 performs a normal operation with respect to the received key signal in step 313.

In the case of the graphic SMS message registration key, the controller 111 changes over the portable radio terminal to a graphic SMS message registration mode in step 315 and edits a graphic SMS message based on key signals received from the keypad 115 in step 317. The graphic SMS message may be edited in many ways. For example, a specific key may be set using a plurality of keys in combination in the keypad 115 and used as a kind of pointer to form a line by connecting a start point to an end point.

The editing step 317 will be described referring to FIG. 4.

If a user wants to send graphic data 410, a graphic SMS message 420 is edited using a plurality of straight lines 1-2, 2-3, 4-5, 5-6, 7-8, 8-9, 10-11, 11-12, 13-14, and 13-15 in the portable radio terminal. Here, straight line editing is performed by Haffman coding. A total of 20 bytes are assigned to the 10 straight lines, 2 bytes given to each straight line. 1 byte is assigned to each character and thus 6 bytes to the word "office". 1 byte is assigned to the header DOCUMENT TYPE 210.

A straight line is edited by connecting a start point to an end point using a specific key, for example, using a scroll key as a pointer in a graphic data editing mode. The start point and the end point each are presented in coordinates and the coordinates list is transmitted as real data in the graphic SMS message.

Upon receipt of a signal corresponding to the key END from the keypad 115, the controller 111 determines that the editing has been completed in step 319 and checks whether a storage key signal has been received from the keypad 115 in step 321. If the storage key signal was not received, the controller 111 checks whether a predetermined time (e.g., 5 seconds) has elapsed in step 323. If the predetermined time does not expire, the controller 111 returns to step 321. After the predetermined time, the controller 111 ends the procedure.

Upon receipt of the storage key signal in step 321, the controller 111 stores the edited graphic SMS message in the memory 113 in step 325 and releases the graphic SMS message registration mode in step 327. If a plurality of graphic SMS messages are edited and registered, they are given sequence numbers, for identification. Then, the procedure ends.

Figure 5:
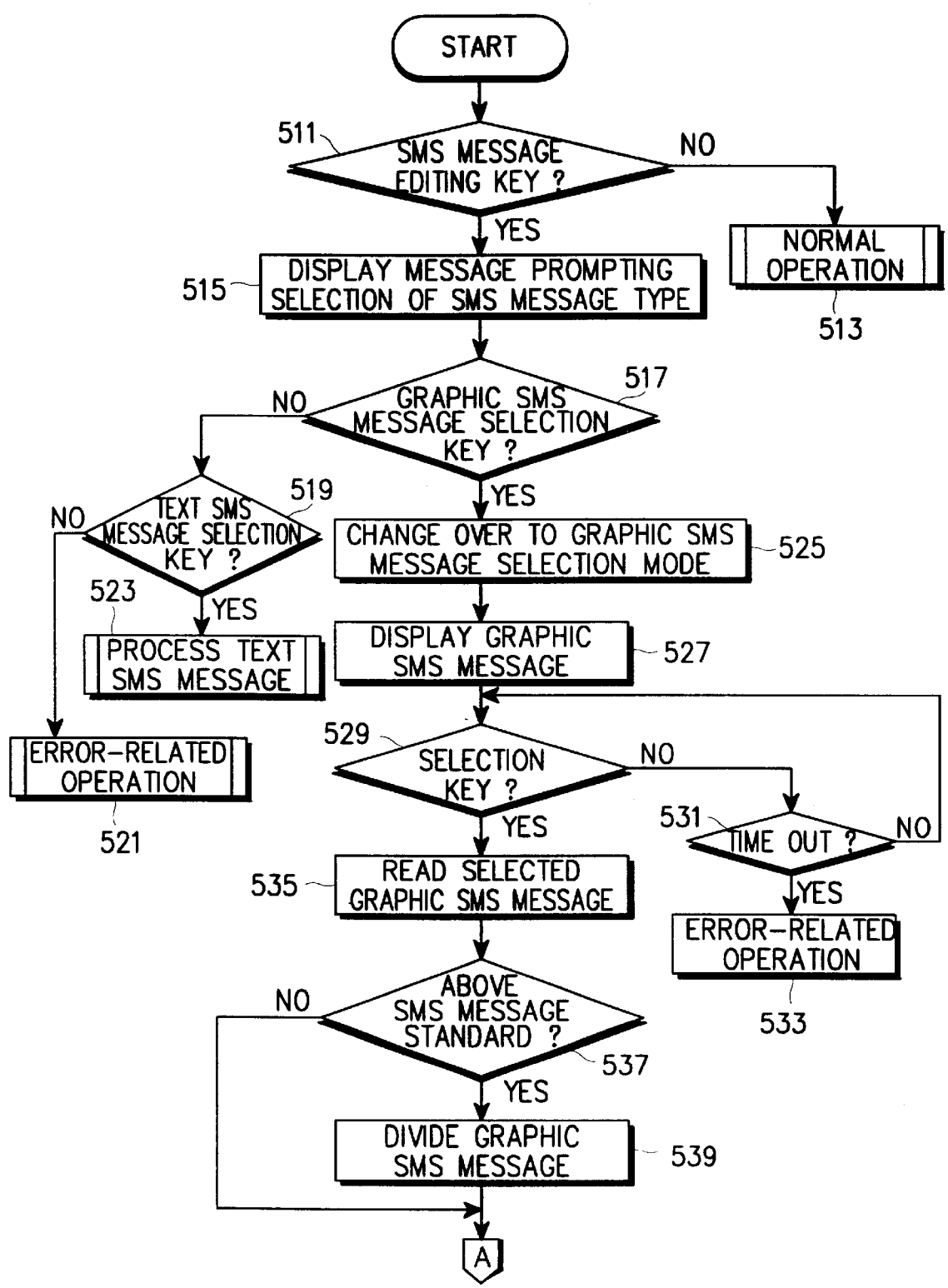
FIGS. 5 and 6 are flowcharts illustrating an embodiment of a graphic SMS message transmitting procedure according to the present invention.
Figure 6:
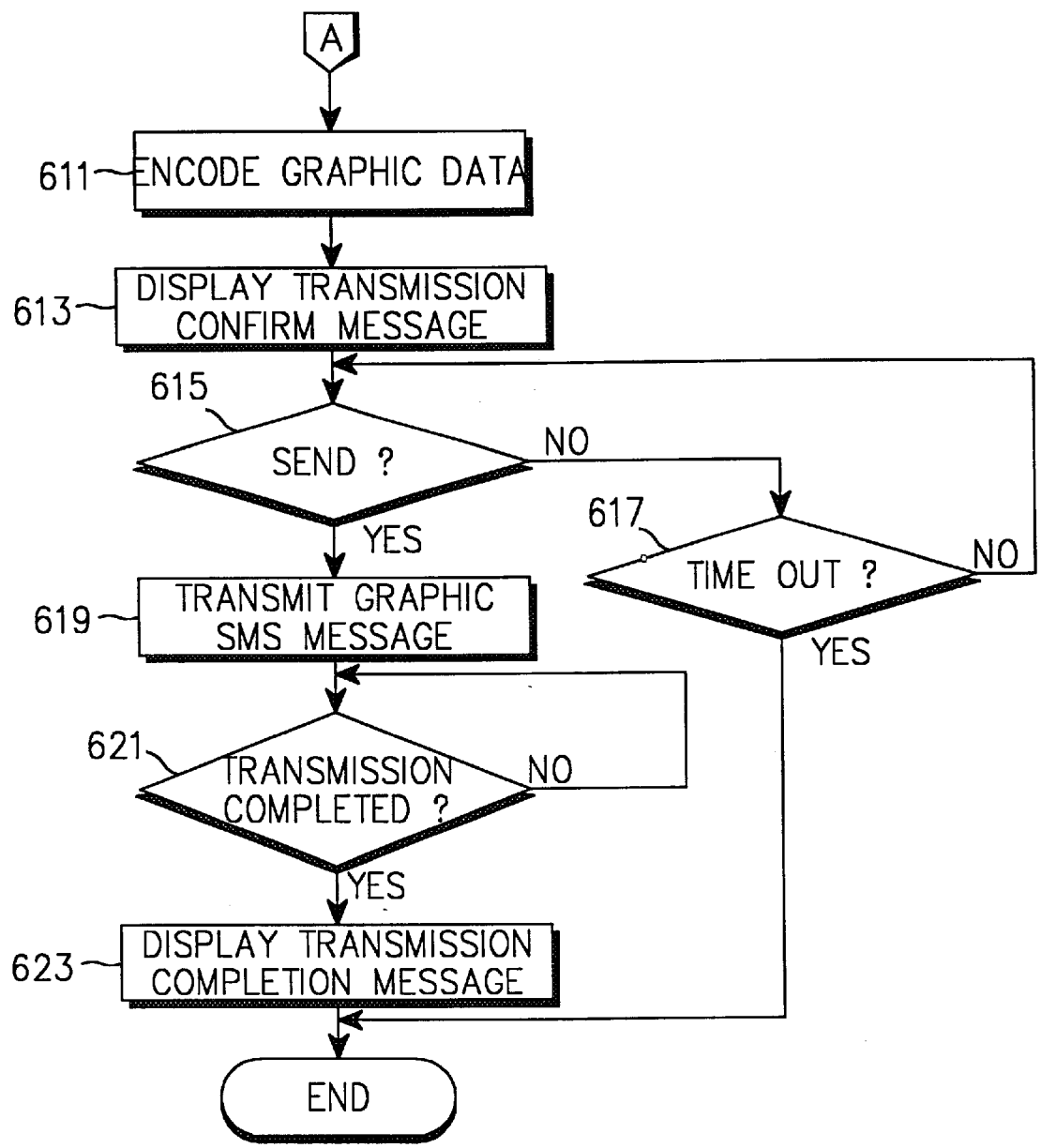

FIGS. 5 and 6 are flowcharts illustrating an embodiment of a graphic SMS message transmitting procedure according to the present invention. Referring to FIGS. 5 and 6, the controller 111 checks whether an SMS message editing key signal has been received in step 511. If the SMS message editing key signal was not received, the controller 111 performs a normal operation with respect to the key signal in step 513.

Upon receipt of the SMS message editing key signal in step 511, the controller 111 reads a message prompting a user to choose an SMS message type between a graphic SMS message and a text SMS message from the memory 113 and displays the read message on the display 127 in step 515. The message may be given as a text message such as "select SMS message type" or as an icon image representing a key set by combining a plurality of keys in the keypad 115.

If a graphic SMS message selection key signal is received in step 517, the controller 111 changes over the portable radio terminal to a graphic SMS message selection mode in step 525. In the graphic SMS message selection mode, a graphic SMS message is selected among those registered in the memory 113. In step 527, the controller 111 reads a graphic selection message, for example, "enter selected number" from the memory 113 and displays the graphic selection message as an icon image on the display 127. The controller 111 checks whether a selection key signal has been received from the keypad 115 in step 529. If the selection key signal was not received, the controller 111 determines whether a predetermined time (e.g., 5 seconds) has elapsed in step 531. If the predetermined time has elapsed, the controller 111 regards the process that has been done so far as an error and performs a related operation in step 533.

Upon receipt of the selection key signal in step 529, the controller 111 reads a graphic SMS message with a sequence number corresponding to the selection key signal from the memory 113 in step 535 and checks whether the data amount of the selected graphic SMS message exceeds the SMS message standard, that is, the maximum data amount of a single text SMS message allowed for one transmission in step 537. If the graphic SMS message exceeds the SMS message standard, the controller 111 divides the graphic SMS message into a plurality of segments according to the SMS message standard in step 539. In this case, each graphic SMS message segment is formatted into a graphic SMS message with DOCUMENT TYPE 210 indicating its segmentation from the original graphic SMS message and its sequence number in the original SMS message.

In step 611, the controller 111 encodes each graphic SMS message segment, for example, by Haffman coding. The controller 111 reads a transmission confirm message asking whether the graphic SMS message will be transmitted, for example, "Send?" from the memory 113 and displays it on the display 127 in step 613. In step 615, the controller 111 checks whether a SEND key signal has been received from the keypad 115. If the SEND key signal was not received, the controller 111 determines whether a predetermined time, say, 5 seconds has elapsed in step 617. If the predetermined time does not expire, the controller 111 returns to step 615. If the predetermined time expires, the controller 111 ends the procedure.

On the other hand, if the SEND key signal was received from the keypad 115 in step 615, the controller 111 sends the graphic SMS message in step 619 and checks whether the transmission is completed in step 621. If the transmission is completed, the controller 111 reads a transmission completion message, for example, "Completed" from the memory 113 and displays it on the display 127 in step 623.

Figure 7:
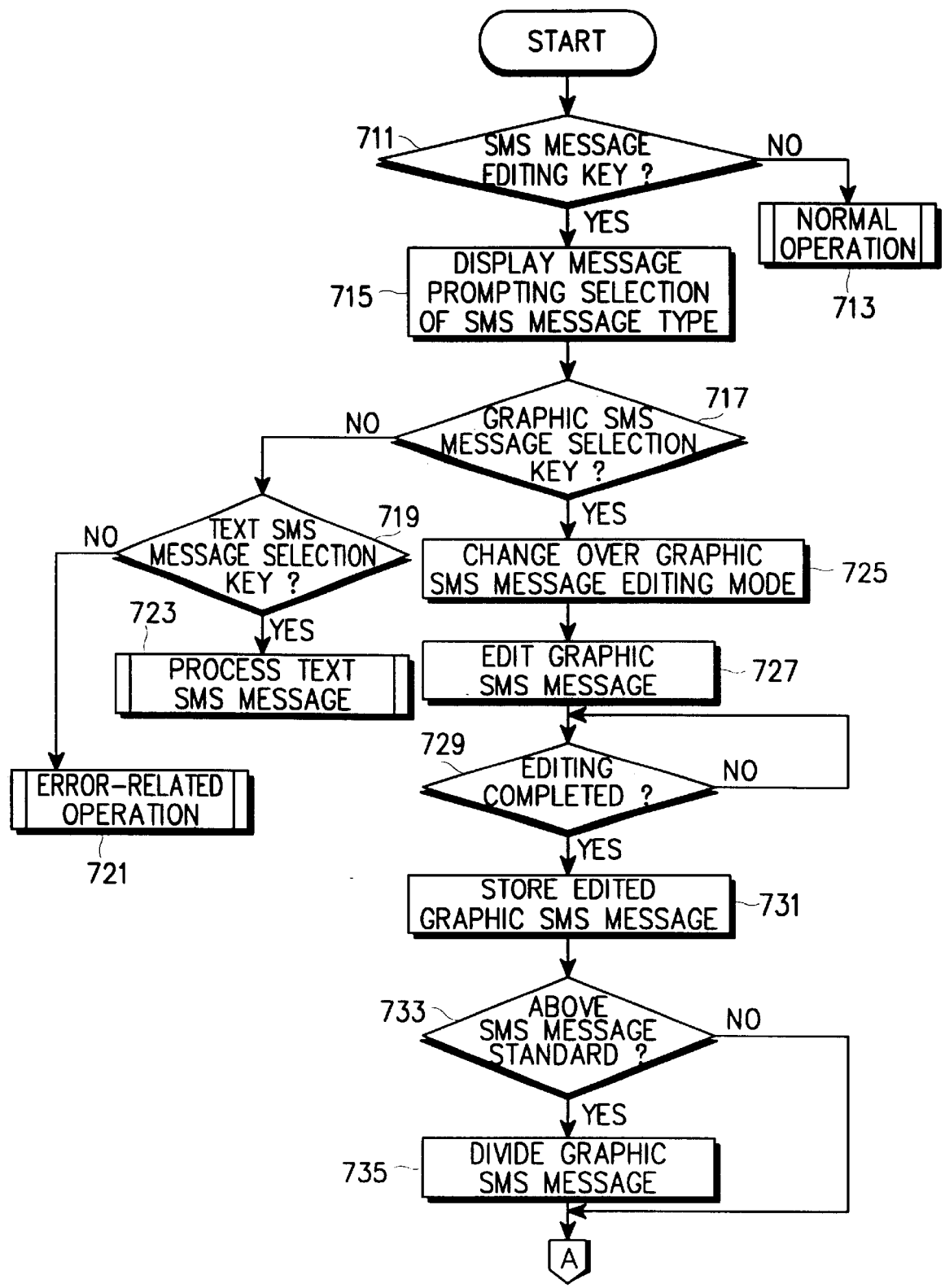
FIG. 7 is a flowchart illustrating another embodiment of the graphic SMS message transmitting procedure according to the present invention.

FIG. 7 is a flowchart illustrating another embodiment of the graphic SMS message transmitting procedure according to the present invention. Referring to FIG. 7, the controller 111 checks whether an SMS message editing key signal has been received in step 711. If the SMS message editing key signal was not received, the controller 111 performs a normal operation with respect to the key signal in step 713.

Upon receipt of the SMS message editing key signal in step 711, the controller 111 reads a message prompting the user to choose an SMS message type between a graphic SMS message and a text SMS message from the memory 113 and displays the message on the display 127 in step 715. The message may be displayed as a text message such as "select SMS message type" or as an icon image representing a key set by combining a plurality of keys in the keypad 115.

If a graphic SMS message selection key signal is not received in step 717, the controller 111 checks whether a text SMS message selection key signal is received in step 719. If the text SMS message selection key signal is not received in step 719, the controller 111 regards the process that has been done so far as an error and performs a related operation in step 721. Upon receipt of the text SMS message selection key signal in step 719, the controller 111 performs a normal text SMS message editing and transmission operation in step 723.

Upon receipt of the graphic SMS message selection key signal in step 717, the controller 111 changes over the portable radio terminal to a graphic SMS message editing mode in step 725. In step 727, the controller 111 edits a user-selected graphic SMS message received from the keypad 115. The graphic SMS message may be edited in many ways. For example, a specific key is set using a plurality of keys in combination in the keypad 115 and used as a kind of pointer to form a line by connecting a start point to an end point. Or upon receipt of a specific key, selectable patterns are read from the memory 113 and displayed on the display 127, so that the user selects one of them. Upon receipt of an editing completion signal in step 729, the controller 111 temporarily stores the edited graphic SMS message in the memory 113 in step 731 and checks whether the edited graphic SMS message exceeds the SMS message standard, that is, the maximum data amount of a single text SMS message allowed for one transmission in step 733. If the graphic SMS message exceeds the SMS message standard, the controller 111 divides the graphic SMS message into a plurality of segments according to the SMS message standard in step 735 and goes to step 611 of FIG. 6.

Figure 8:
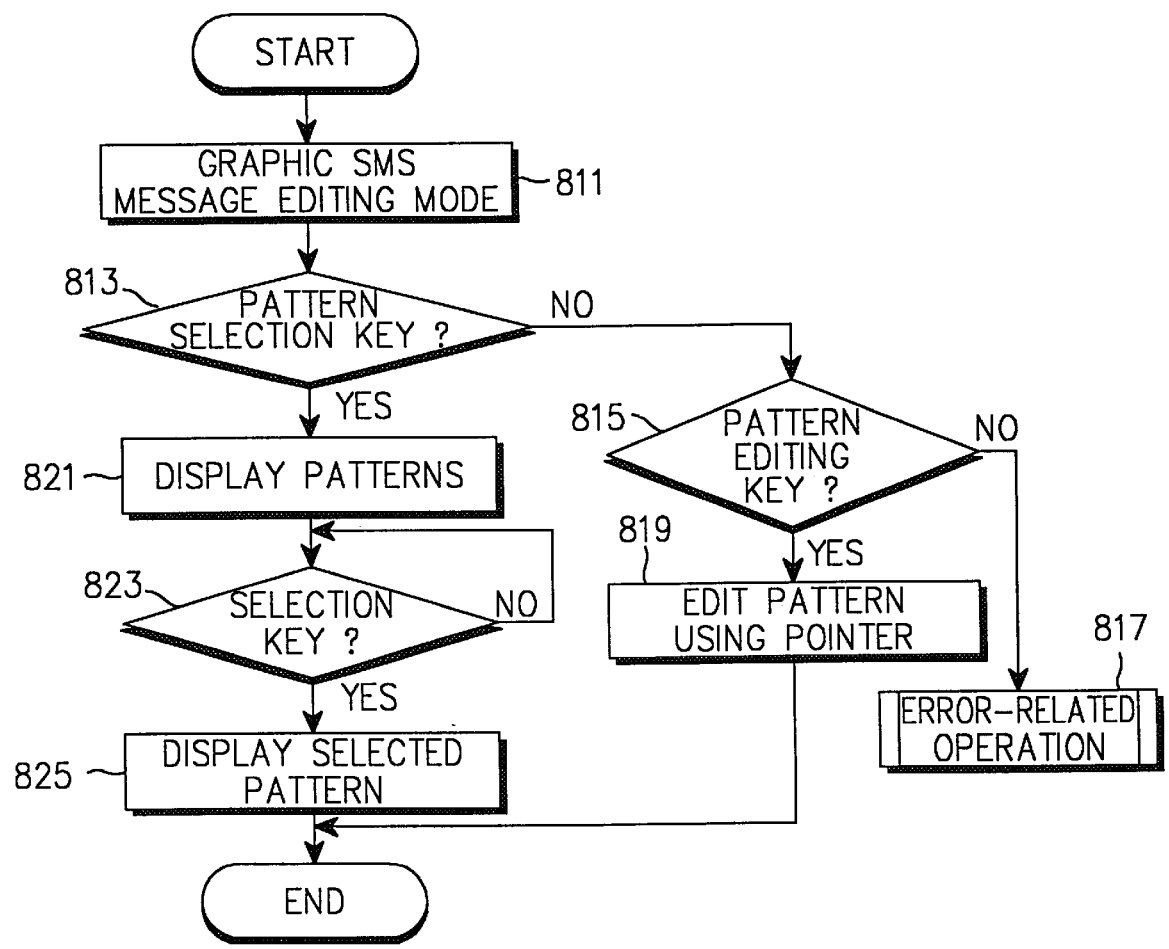
FIG. 8 is a flowchart illustrating an embodiment of a graphic SMS message editing procedure according to the present invention.

FIG. 8 is a flowchart illustrating an embodiment of a graphic SMS message editing procedure according to the present invention. Referring to FIG. 8, after the controller 111 changes over the portable mobile terminal to an SMS message editing mode in step 811, it checks whether a pattern selection key signal has been received in step 813. If the pattern selection key signal was not received, the controller 111 checks whether a pattern editing key signal has been received in step 815. If the pattern editing key signal was not received, the controller 111 regards the process that has been performed so far as an error and performs a related operation in step 817.

Upon receipt of the pattern editing key signal in step 815, the controller 111 edits a pattern using a specific key in the keypad 115 as a pointer in the manner described in context with step 317 of FIG. 3 in step 819.

Upon receipt of the pattern selection key signal in step 813, the controller 111 reads selectable patterns from the memory 113 and displays them on the display 127 in step 821. The selectable patterns were registered in advance in the memory 113, such as a rectangle, a triangle, and so on.

In step 823, the controller 111 checks whether a selection key signal has been received from the keypad 115. Upon receipt of the selection key signal, the controller 111 displays a pattern corresponding to the selection key signal on the display 127 in step 825.

Figure 9:
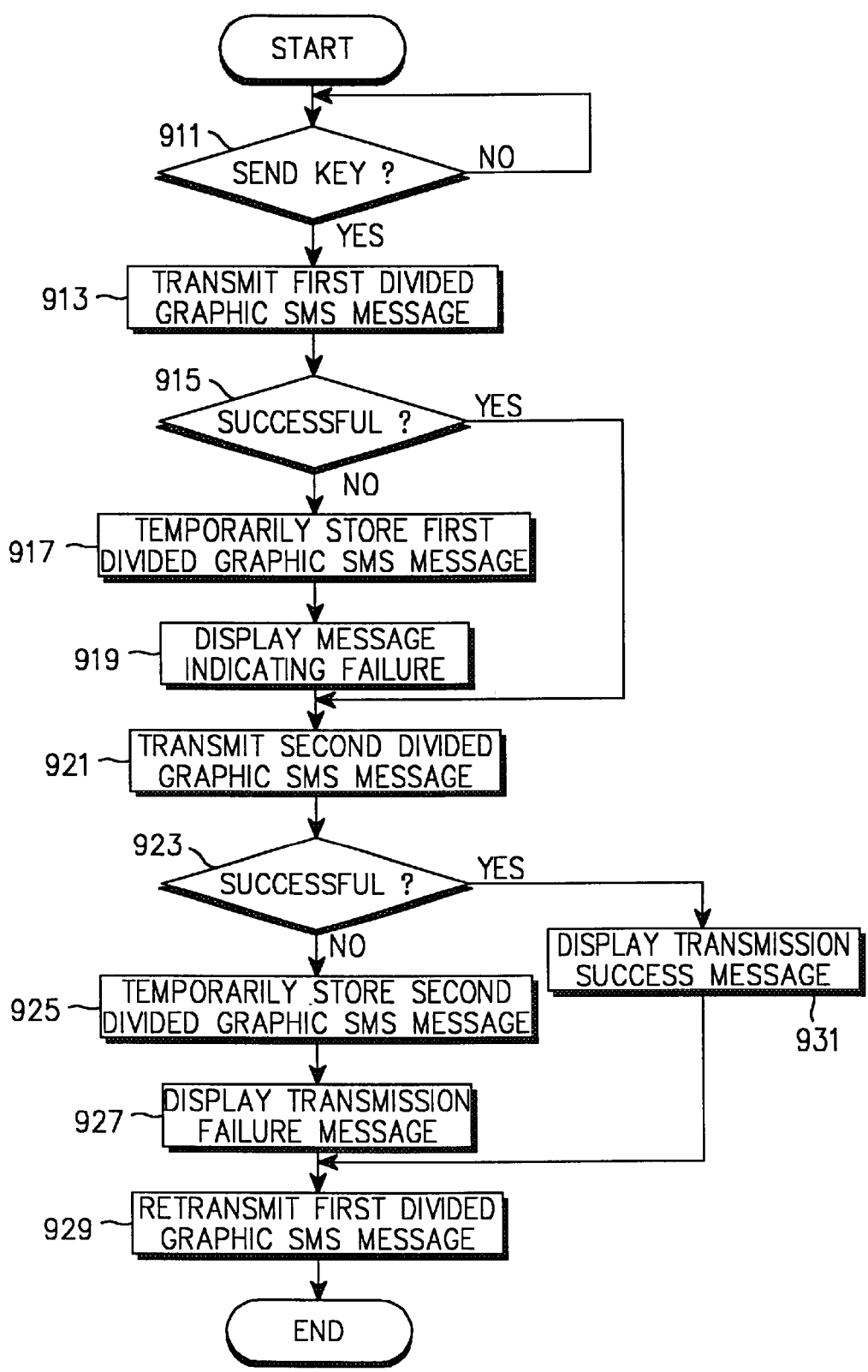
FIG. 9 is a detailed flowchart illustrating the transmission operation shown in FIG. 6.

FIG. 9 is a flowchart illustrating the procedure of transmitting graphic SMS message segments shown in FIG. 6 in detail. Here, it is assumed that a graphic SMS message is divided into two segments.

Referring to FIG. 9, upon receipt of a SEND key signal from the keypad 115, the controller 111 transmits a first graphic SMS message in step 913 and checks whether the transmission is successful in step 915. If the transmission has failed, the controller 111 temporarily stores the failed first graphic SMS message in the memory 113 in step 917. Then, the controller 111 reads a transmission failure message such as "Failed" from the memory 113 and displays it on the display 127 in step 919. If, at step 915 transmission was successful, the process proceeds to step 921.

In step 921, the controller 111 transmits a second graphic SMS message. The controller 111 checks whether the transmission is successful in step 923. If the transmission has failed, the controller 111 temporarily stores the failed second graphic SMS message in the memory 113 in step 925. Then, the controller 111 reads a transmission failure message such as "Failed" from the memory 113 and displays it on the display 127 in step 927.

On the other hand, if the second graphic SMS message was successfully transmitted in step 923, the controller 111 reads a transmission success message such as "Successful" from the memory 113 and displays it on the display 127 in step 931. In step 929, the controller 111 reads the failed first graphic SMS message from the memory 113 and retransmits it.

Figure 10:
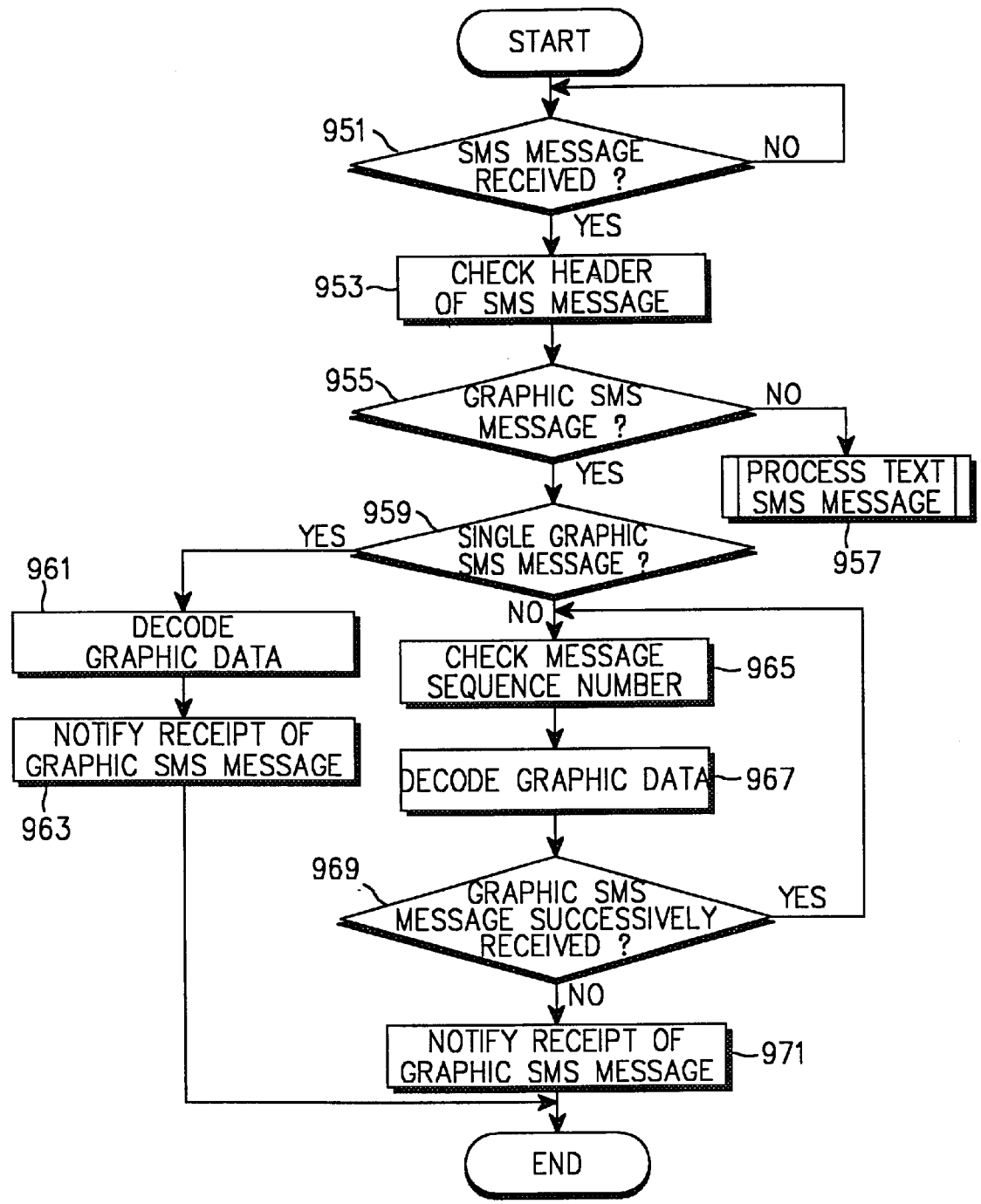
FIG. 10 is a flowchart illustrating an embodiment of a graphic SMS message receiving procedure according to the present invention.

FIG. 10 is a flowchart illustrating an embodiment of a graphic SMS message receiving procedure according to the present invention. Referring to FIG. 10, upon receipt of an SMS message in step 951, the controller 111 detects the header DOCUMENT TYPE of the received SMS message in step 953 and checks whether the SMS message is a graphic SMS message based on DOCUMENT TYPE in step 955. If the SMS message is not a graphic SMS message, the controller 111 performs a normal text SMS message process in step 957.

In the case of a graphic SMS message, the controller 111 determines whether the graphic SMS message is a single one based on DOCUMENT TYPE in step 959. If the graphic SMS message is a single one, the controller 111 decodes the received graphic data in step 961 and notifies the user of receipt of the graphic SMS message by displaying it in the form of an icon image on the display 127 or sounding an alarm in step 963.

If the graphic SMS message is not a single one, the controller 111 detects a message sequence number from DOCUMENT TYPE in step 965. The controller 111 decodes the graphic SMS message according to its message sequence number in step 967 and checks whether another graphic SMS message has been received successively in step 969. Upon successive receipt of the next graphic SMS message, the controller 111 returns to step 965. If another graphic SMS message is not received successively, the controller 111 notifies the user of receipt of the graphic SMS message in step 971.

In accordance with the present invention as described above, a graphic SMS message as well as a text SMS message can be transmitted by an SMS in a portable radio terminal. Therefore, a user message is transmitted more effectively and more conveniently.

Furthermore, a graphic SMS message can be transmitted utilizing a conventional SMS simply by modifying the MMI (Man Machine Interface) of the portable radio terminal. Consequently, the use efficiency of radio resources in a mobile communication system is increased.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method of transmitting a graphic SMS (Short Message Service) message in a portable radio terminal, comprising the steps of:

registering graphic SMS messages for transmission;

prompting a user to choose an SMS message type between a graphic SMS message and a text SMS message upon receipt of an SMS message editing key signal;

switching the portable radio terminal to a graphic SMS message selection mode;

receiving a graphic SMS message selected among the registered graphic SMS messages;

encoding graphic data of the selected graphic SMS message; and transmitting the encoded graphic data.

2. The method of claim 1, wherein the registration step comprises the steps of:

switching the portable radio terminal to a graphic SMS message registration mode upon receipt of a graphic SMS registration key signal;

editing the graphic SMS message using a pointer in the graphic SMS message registration mode; and registering the edited graphic SMS message upon receipt of a storage key signal.

3. The method of claim 1, wherein the graphic SMS message includes:

a header indicating whether an SMS message is a text type or an graphic data type;

a first area indicating whether the SMS message is presented as a straight line, a curved line, a polygon, or a text; and a second area that provides a coordinates list of graphic data if the SMS message is the graphic data type and provides text data if the SMS message is the text type.

4. The method of claim 1, wherein the graphic data is encoded by Haffman coding.

5. A method of transmitting a graphic SMS message in a portable radio terminal, comprising the steps of:

prompting a user to choose an SMS message type between a graphic SMS message and a text SMS message upon receipt of an SMS message editing key signal;

switching the portable radio terminal to a graphic SMS message editing mode if the graphic SMS message is selected as the SMS message type to be transmitted;

editing the graphic SMS message to be transmitted in the graphic SMS message editing mode;

encoding the edited graphic SMS message if the editing is completed; and transmitting the encoded graphic SMS message.

6. The method of claim 5, further comprising the steps of editing a text SMS message to be transmitted and transmitting the edited text SMS message if the text SMS message is selected as the SMS message type to be transmitted.

7. The method of claim 5, wherein a specific key is set using a plurality of keys of the portable radio terminal in combination and a line is formed by connecting a start point to an end point using the specific key as a pointer in the graphic SMS message editing step.

8. The method of claim 5, wherein the graphic SMS message editing step comprises:

displaying pre-registered selectable patterns upon receipt of a pattern selection key signal;

selecting one of the selectable patterns; and displaying the selected pattern.

9. The method of claim 5, wherein the graphic data is encoded by Haffman coding.

10. The method of claim 5, wherein the graphic SMS message includes:

a header indicating whether an SMS message is a text type or an graphic data type;

a first area indicating whether the SMS message is presented as a straight line, a curved line, a polygon, or a text; and a second area that provides a coordinates list of graphic data if the SMS message is the graphic data type and provides text data if the SMS message is the text type.

11. The method of claim 9, further comprising the steps of:

determining whether a data amount of the edited graphic SMS message exceeds an SMS message standard length;

dividing the graphic SMS message into a plurality of segments according to the SMS message standard length if the data amount of the edited graphic SMS message exceeds the SMS message standard length;

encoding the graphic SMS message segments; and sequentially transmitting the encoded graphic SMS message segments.

12. The method of claim 11, wherein the sequential transmission step comprises:

sequentially transmitting the graphic SMS message segments in an order of a higher priority with respect to the headers of the graphic SMS message segments;

completing the sequential transmission procedure if a transmission-failed graphic SMS message segment exists; and retransmitting the transmission-failed graphic SMS message segment.

13. The method of claim 11, wherein a specific key is set using a plurality of keys of the portable radio terminal in combination and a line is formed by connecting a start point to an end point using the specific key as a pointer in the graphic SMS message editing step.

14. A method of transmitting a graphic SMS message in a portable radio terminal, comprising the steps of:

prompting a user to choose an SMS message type between a graphic SMS message and a text SMS message upon receipt of an SMS message editing key signal;

switching the portable radio terminal to a graphic SMS message editing mode;

editing the graphic SMS message to be transmitted in the graphic SMS message editing mode; and dividing the edited graphic SMS message into a plurality of segments to an SMS message standard length if a data amount of the edited graphic SMS message exceeds an SMS message standard length.

15. The method of claim 14, wherein pre-registered graphic data is selected or graphic data is received using a pointer in the graphic SMS message editing step.

* * * * *